US008646030B2

(12) United States Patent
Hu et al.

(10) Patent No.: US 8,646,030 B2
(45) Date of Patent: Feb. 4, 2014

(54) METHOD AND APPARATUS FOR MASTER PRIVACY POLICY MECHANISM IN A COMMUNICATIONS NETWORK

(75) Inventors: Qingmin Hu, Sammamish, WA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 26 days.

(21) Appl. No.: 13/306,669

(22) Filed: Nov. 29, 2011

(65) Prior Publication Data

US 2013/0139215 A1    May 30, 2013

(51) Int. Cl.
*H04L 12/22*    (2006.01)
*H04L 12/24*    (2006.01)

(52) U.S. Cl.
USPC .................................................. 726/1; 726/30

(58) Field of Classification Search
None
See application file for complete search history.

(56) References Cited

U.S. PATENT DOCUMENTS

| 6,021,263 | A | * | 2/2000 | Kujoory et al. | 709/232 |
| 2004/0054919 | A1 | * | 3/2004 | Duri et al. | 713/200 |
| 2007/0294750 | A1 | * | 12/2007 | Burch et al. | 726/5 |
| 2009/0138276 | A1 | * | 5/2009 | Hayashida et al. | 705/1 |
| 2009/0254511 | A1 | * | 10/2009 | Yeap et al. | 707/1 |
| 2010/0146583 | A1 | * | 6/2010 | Prehofer et al. | 726/1 |

* cited by examiner

*Primary Examiner* — Venkat Perungavoor

(57) ABSTRACT

A method, non-transitory computer readable medium and apparatus for providing a master privacy policy in a communications network are disclosed. For example, the method receives a privacy control parameter to configure a master privacy policy, stores the master privacy policy in the communications network, and applies the master privacy policy to configure a third party service provider privacy policy for a third party service provider based upon the master privacy policy.

18 Claims, 10 Drawing Sheets

600

METHOD AND APPARATUS FOR MASTER PRIVACY POLICY MECHANISM IN A COMMUNICATIONS NETWORK

The present disclosure relates generally to managing privacy and, more particularly, to a method and apparatus for providing a policy based privacy control in a communications network.

BACKGROUND

An ever increasing number of Internet services (e.g., Facebook®, Google®, Twitter®, Amazon.com®, Apple®, and the like) require more and more user identifiable information. How to protect this information becomes increasingly critical for both the users and the service providers. Each one of the service providers may have their own privacy policies and the users are required to manage each one of these policies separately. For example, the users may be required to constantly update and change the privacy policies for each one of the service providers. As the number of service providers continues to grow, managing each of the privacy policies separately becomes a very difficult task for all parties involved.

SUMMARY

In one embodiment, the present disclosure provides a method, non-transitory computer readable medium and apparatus for providing a master privacy policy in a communications network. In one embodiment, the method receives a privacy control parameter to configure a master privacy policy, stores the master privacy policy in the communications network, and applies the master privacy policy to configure a third party service provider privacy policy for a third party service provider based upon the master privacy policy.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for providing a policy based privacy control in a communications network. Privacy control for each one of the numerous Internet service providers is important to protect information of an end user.

In one embodiment, a more efficient method of providing a policy based privacy control in a communications network is provided. For example, a centralized subscriber privacy vault (SPV) may be deployed to automatically manage privacy policies for any number of third party services used by an end user. For example, the SPV may automatically configure each one of the third party service provider policies and automatically proliferate any changes made to a master privacy policy stored in the SPV.

Figure 1:
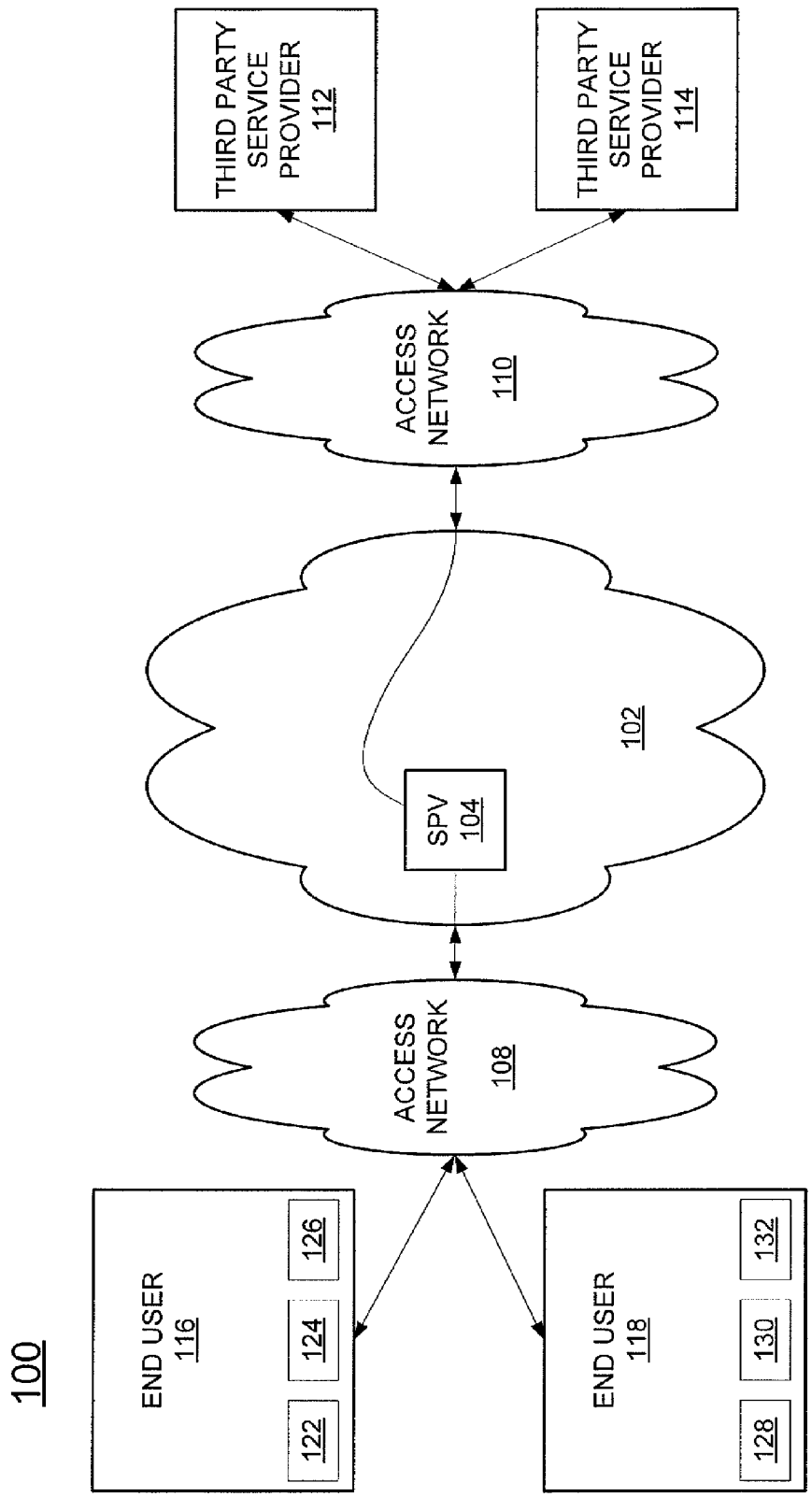
FIG. 1 illustrates one example of a communications network of the present disclosure.

FIG. 1 is a block diagram depicting one illustrative example of a communications network 100. For example, the communications network 100 may be any type Internet Protocol (IP) network. It should be noted that an IP network is broadly defined as a network that uses Internet Protocol to exchange data packets.

In one embodiment, the network 100 may comprise one or more endpoint devices 122, 124, 126, 128, 130 and 132 associated with one or more end users 116 and 118, respectively, one or more access networks 108 and 110 of the same operator or different operators (e.g., a wired access network or a wireless access network), a core network 102 and one or more third party service providers 112 and 114 (e.g., employing one or more application servers). In one embodiment, the endpoint devices 122, 124, 126, 128, 130 and 132 may be any type of device capable of communicating over the communications network 100. For example, the endpoint devices 122, 124, 126, 128, 130 and 132 may be a cellular telephone, a smart phone, a tablet computer, a laptop computer, a desktop computer, a netbook and the like. Although six endpoint devices 122, 124, 126, 128, 130 and 132, two end users 116 and 118 and two third party service providers 112 and 114 are illustrated, it should be noted that any number of endpoint devices, end users or third party service providers may be deployed without limitation.

Although FIG. 1 illustrates certain endpoints associated with the end users 116 and 118, it should be noted that there may not be a one to one correlation between the end users 116 and 118 and the endpoint devices 122, 124, 126, 128, 130 and 132. In other words, some endpoint devices may be used by both the end users 116 and 118. Said yet another way, a single endpoint device is not necessarily dedicated to only a single end user, i.e., the single endpoint device can be used by multiple users.

In one embodiment, the access networks 108 and 110 may be any type of access network such as a cellular network, a wireless network, a Wi-Fi network, a Publicly Switched Telephone Network (PSTN), an IP network and the like. The access networks 108 and 110 may be operated by the same operator or by different operators. The access networks 108 and 110 and the core network 102 may include additional network elements that are not disclosed. For example, the access networks 108 and 110 and the core network 102 may also include border elements, gateways, routers, switches, call control elements, various application servers and the like.

In one embodiment, the core network 102 may include an SPV 104. In one embodiment, the SPV 104 provides a centralized privacy policy control via the core network 102. For example, the SPV 104 may store a master privacy policy for each subscriber (also referred to herein as "users") of the core network 102. For example, the end user 116 may have a master privacy policy stored at the SPV 104 and the end user 118 may have a master privacy policy stored at the SPV 104. In one embodiment, each master privacy policy associated with each end user 116 and 118 may be associated with a unique pointer, e.g., a unique universal resource locator (URL) address. Thus, the user may direct requests for privacy policy configurations to a particular URL address such that the privacy policy may be configured in accordance with the master privacy policy.

In one embodiment, the master privacy policy is configured based upon one or more privacy control parameters provided by the end user 116 and 118. For example, an end user 116 may be provided with a user interface, e.g., a web page, that allows the user to input his or her preferences for the privacy control parameters. In one embodiment, the user interface may be protected with a personal login and password. In other words, an authentication mechanism may be deployed to authenticate the end user 116 before the end user 116 may access the SPV 104.

In one embodiment, the privacy control parameter may simply be an overall level of privacy desired by a user, e.g., high, medium or low. In another embodiment, the privacy control parameter may be a sharing parameter. For example, the user may specify which groups of people should have access to which types of information. To illustrate, the user may specify that family members may have access to all information of the user, that friends may have access to general information of the user, that work colleagues may have access to only work related information of the user, and the like.

It should be noted that the above privacy control parameters are provided only as examples and should not be considered limiting. Other types of privacy control parameters not listed above may be considered to be within the embodiments of the present disclosure.

As noted above, using the privacy control parameters received from the end users 116 and 118, a master privacy policy can be configured for the end users 116 and 118. As a result, the SPV 104 provides a centralized repository and control mechanism for configuring any third party service provider privacy policy automatically. Thus, the end user does not need to manage each third party service provider privacy policy separately, but rather, only needs to manage a single privacy policy, e.g., the master privacy policy stored in the SPV 104 in the communications network 100.

To illustrate, when an end user 116 accesses a service offered by the third party service provider 112, the end user 116 may be required to configure a third party service provider privacy policy. For example, the third party service provider 112 may be Facebook®. Rather than manually configuring the third party service provider privacy policy, the end user 116 may simply direct the third party service provider 112 to refer to the master privacy policy stored in the SPV 104. For example, the end user 116 may provide a URL to the third party service provider 112 that points to his or her respective master privacy policy stored in the SPV 104. As a result, the third party service provider privacy policy may be automatically configured by mapping the master privacy policy to the third party service provider privacy policy.

Subsequently, the end user 116 accesses another service offered by the third party service provider 114. The end user 116 will be required to again configure another third party service provider privacy policy. For example, the third party service provider 114 may be an Apple® iTunes® store. Again, rather than manually configuring another third party service provider privacy policy, the end user 116 may again direct the third party service provider 114 to refer to the master privacy policy stored in the SPV 104. As a result, the third party service provider privacy policy may be automatically configured by mapping the master privacy policy to the third party service provider privacy policy.

In one embodiment, if a mapping cannot be found between the master privacy policy and the third party service provider privacy policy, the SPV 104 may send a notification to the end user 116 via one of the endpoint devices 122, 124 or 126 to request a clarification. For example, the SPV 104 may send an email, text message or interactive voice call to the endpoint 122 to request the end user 116 to clarify how the end user 116 would like to configure a particular privacy control parameter of the third party service provider privacy policy if a mapping cannot be found using the master privacy policy.

In one embodiment, if any changes to the master privacy policy are made, the SPV 104 may automatically proliferate the changes to all of the third party service providers, e.g., the third party service providers 112 and 114, that are accessed by the end user 116. Consequently, the end user 116 does not have to manually go to each third party service provider 112 and 114 separately to change each respective third party service provider privacy policy. Thus, a significant amount of time and effort can be saved by the end user 116 by changing only the master privacy policy and having the SPV 104 automatically proliferates the changes.

The change may be due to a user changing his or her preference for one or more of the privacy control parameters of the master privacy policy or the change may be due to a change in government regulations regarding privacy issues. In one embodiment, the SPV 104 may track each of the third party service providers that have been accessed by the endpoint device 116 and have had a third party service provider privacy policy configured by the SPV 104. This allows the SPV 104 to know which third party service provider privacy policies need to be updated with the change to the master privacy policy.

In one embodiment, the endpoint device 122, 124, 126, 128, 130 and 132 of the end users 116 and 118, respectively, may enforce the implementation of the master privacy policy. For example, once the master privacy policy is configured and stored at the SPV 104, the endpoint device 122 may receive a copy. The endpoint device 122 may refer to the copy of the master privacy policy when a transaction is detected with a third party service provider, e.g., the third party service providers 112 and 114, to ensure that the third party service provider is acting properly. Notably, the third party service provider privacy policy should act properly since it was configured in accordance with the master privacy policy.

In one embodiment, if the endpoint device 122 detects that the master privacy policy is being violated by a transaction, the endpoint device 122 may block the transaction. In addition, the endpoint device 122 may notify the end user 116 and the SPV 104. As a result, the SPV 104 may attempt to re-configure the third party service provider privacy policy automatically or the user may attempt to change a particular privacy control parameter of the third party service provider privacy policy that violated the master privacy policy.

Figure 2:
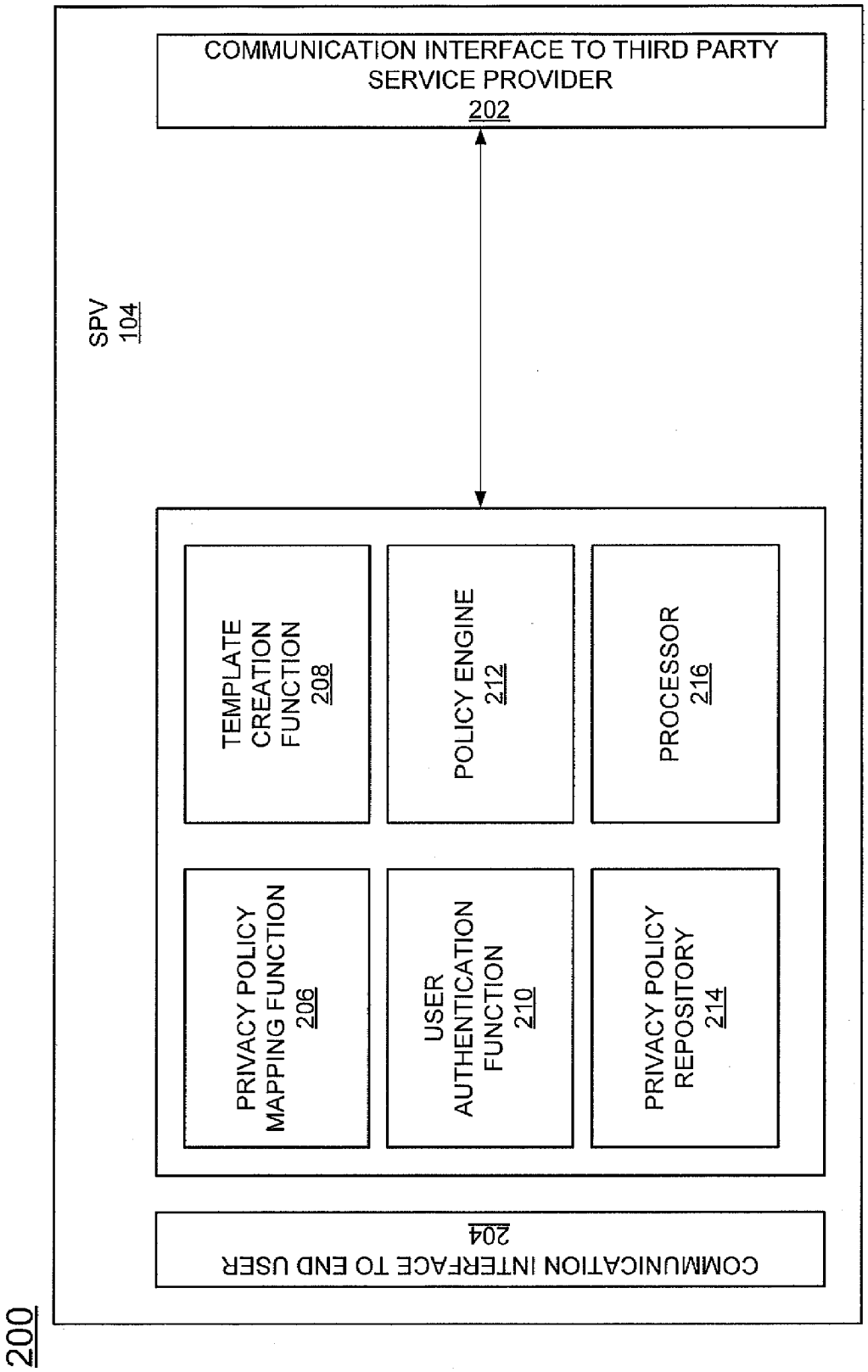
FIG. 2 illustrates a block diagram of a subscriber privacy vault.

FIG. 2 illustrates a block diagram of one embodiment of the SPV 104. In one embodiment, the SPV 104 may include a communication interface to third party service providers 202, a communication interface to end users 204, a privacy policy mapping function 206, a template creation function 208, a user authentication function 210, a policy engine 212, a privacy policy repository 214 and a processor 216.

Figure 4:
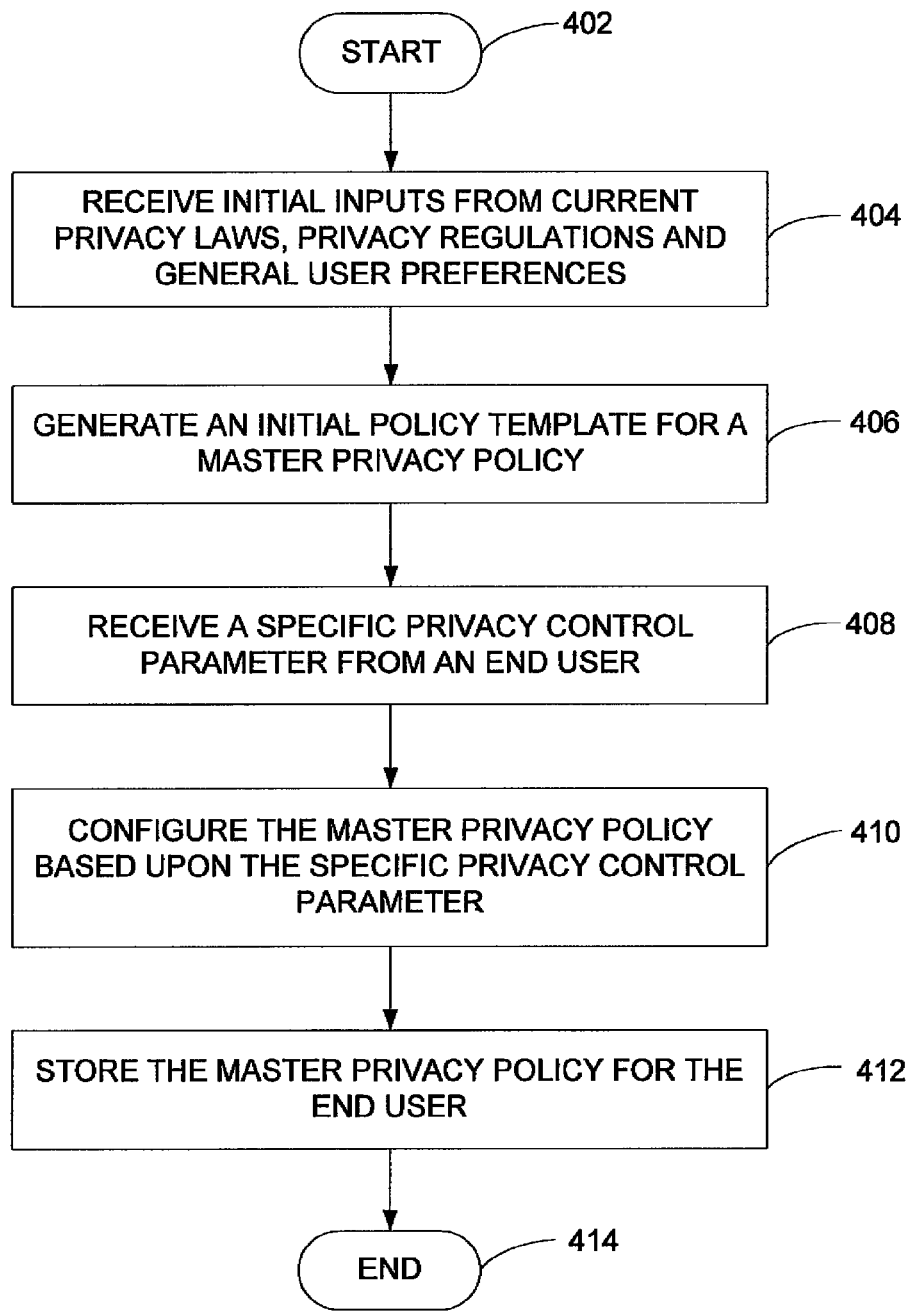
FIG. 4 illustrates an example flow chart of a method for generating a master privacy policy.
Figure 5:
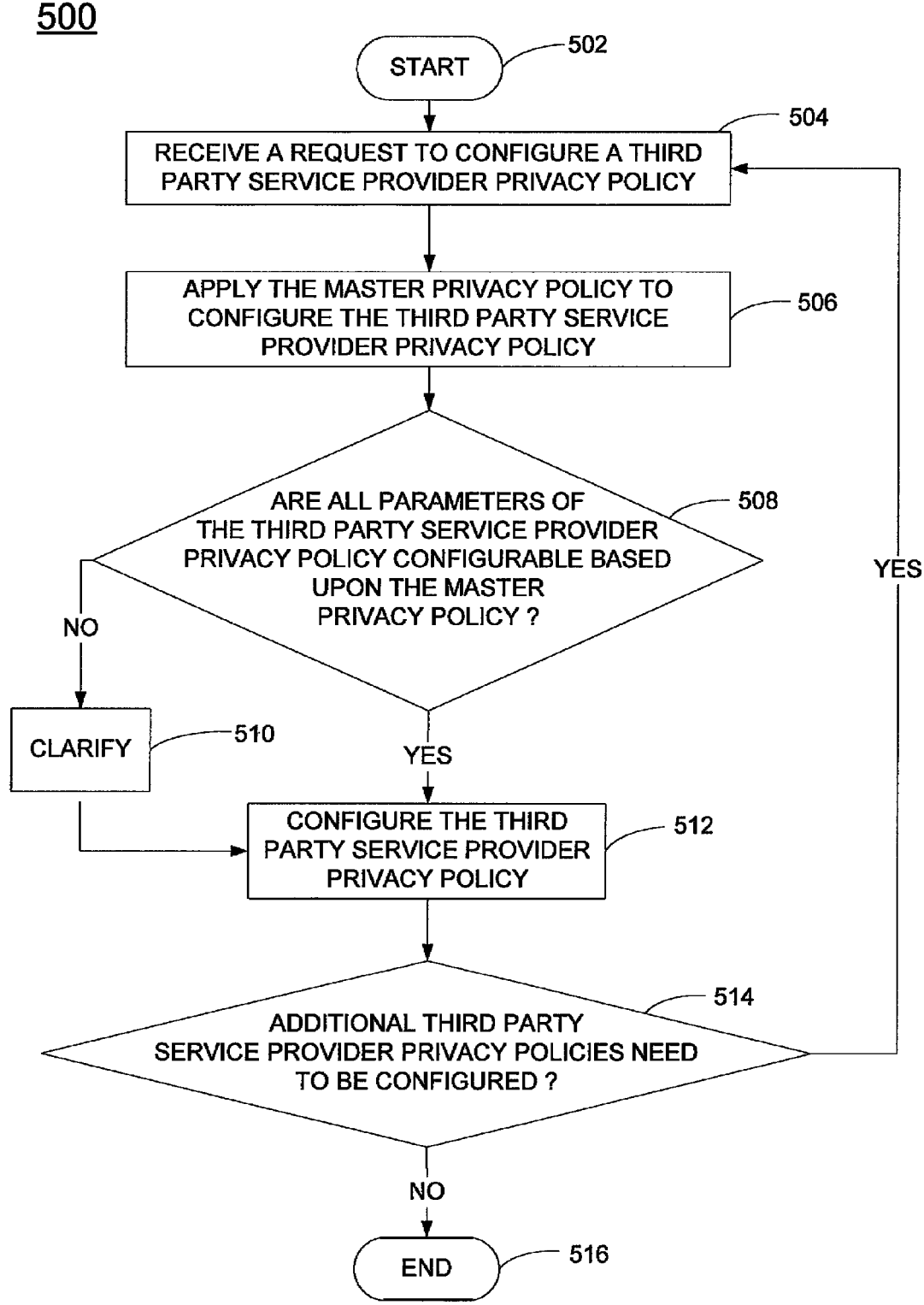
FIG. 5 illustrates an example flow chart of a method for policy mapping.

In one embodiment, the privacy policy mapping function 206 may execute a method for policy mapping as illustrated in FIG. 5 and discussed below. In one embodiment, the template creation function 208 may execute a method for generating a template as illustrated in FIG. 4 and discussed below. In one embodiment, the user authentication function 210 may execute an authentication procedure as noted above. In one embodiment, the policy engine 212 may be responsible for executing the master privacy policy. In one embodiment, the privacy policy repository 214 may store all of the master privacy policies for each one of the end users.

Figure 3:
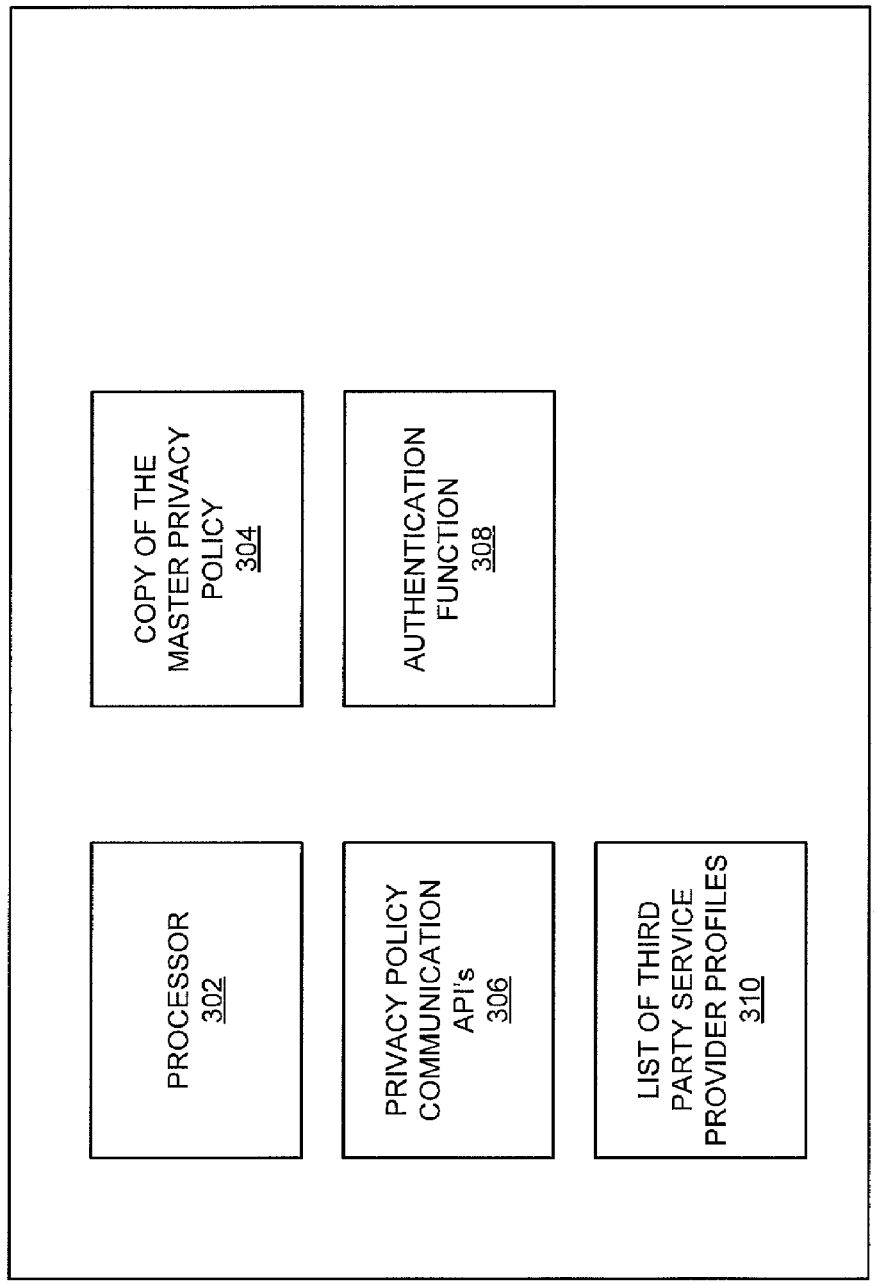
FIG. 3 illustrates a block diagram of an endpoint device of an end user.

FIG. 3 illustrates a block diagram of one embodiment of an endpoint device 300. In one embodiment, the endpoint device 300 may include a processor 302, a copy of the master privacy policy 304, a privacy policy communication application programming interface (API) 306, an authentication function 308 and a list of third party service provider profiles 310. It should be noted that the endpoint device 300 may also include other components that are not illustrated.

In one embodiment, the authentication function 308 may be used to authenticate an end user that has provided authentication credentials. In one embodiment, the copy of the master privacy policy 304 and the list of third party service provider profiles 310 may be loaded after the end user has been authenticated by the authentication function 308. In other words, the copy of the master privacy policy 304 and the list of third party service provider profiles 310 may not actually exist until after an end user is successfully authenticated. In one embodiment, the list of third party service provider profiles 310 includes at least one profile for each of the services of a third party service provider that an end user is subscribed to.

Figure 10:
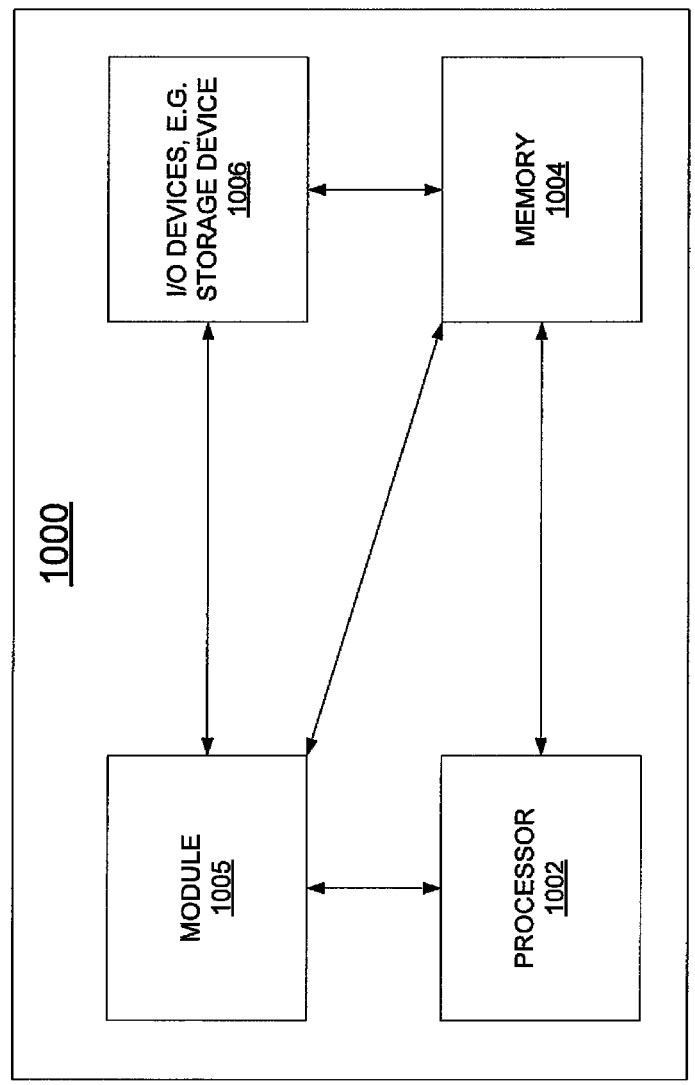
FIG. 10 illustrates a high-level block diagram of a general-purpose computer suitable for use in performing the functions described herein.

FIG. 4 illustrates a flowchart of a method 400 for generating a master privacy policy. In one embodiment, the method 400 may be performed by a SPV 104 illustrated in FIGS. 1 and 2 or a general purpose computer having a processor or a general purpose computer as illustrated in FIG. 10 and discussed below.

The method 400 begins at step 402 and proceeds to step 404. At step 404, the method 400 receives or obtains initial inputs from current privacy laws, privacy regulations and general user preferences.

At step 406, the method 400 generates an initial policy template for a master privacy policy based upon the initial inputs that were received. The initial policy template may provide a guideline to an end user as to which parameters need to be configured or can be personalized.

At step 408, the method 400 receives one or more specific privacy control parameters from an end user. For example, when an end user initially subscribes to or activates a service for the centralized privacy policy control via the communications network, the end user must provide an initial privacy policy control parameter to initially configure a master privacy policy. In one embodiment, there may be more than one privacy policy control parameter.

In one embodiment, the privacy control parameter may be an overall level of privacy desired by an end user, e.g., a high level of privacy, a medium level of privacy or a low level of privacy. In another embodiment, the privacy control parameter may be a sharing parameter. For example, the end user may specify which groups of people should have access to which types of information. To illustrate, the end user may specify that family members may have access to all information of the end user, that friends may have access to general information of the end user, that work colleagues may have access to only work related information of the end user, and the like.

It should be noted that the above privacy control parameters are provided only as examples and should not be considered limiting. Other types of privacy control parameters not listed above may be considered to be within the embodiments of the present disclosure.

At step 410, the method 400 configures the master privacy policy based upon the one or more specific privacy control parameters received from the end user.

At step 412, the method 400 stores the master privacy policy for the end user. In one embodiment, the master privacy policy may be stored at the SPV 104. The method 400 ends at step 414.

FIG. 5 illustrates a flowchart of a method 500 for policy mapping. In one embodiment, the method 500 may be performed by a SPV 104 illustrated in FIGS. 1 and 2 or a general purpose computer having a processor or a general purpose computer as illustrated in FIG. 10 and discussed below.

The method 500 begins at step 502 and proceeds to step 504. At step 504, the method 500 receives a request to configure a third party service provider privacy policy. In one embodiment, the request may be received from the third party service provider or the end user. In one embodiment, the request may be generated from a new subscription or request for a service initiated by the end user or due to a change to the master privacy policy.

At step 506, the method 500 applies the master privacy policy to configure a third party service provider privacy policy.

At step 508, the method 500 determines if all parameters of the third party service provider privacy policy are configurable based upon the master privacy policy. In other words, the method determines whether each one of the parameters in the third party service provider privacy policy can be correlated to a parameter in the master privacy policy. For example, if the master privacy policy is configured using a general privacy control parameter such as "high privacy", the "high privacy" may be mapped to the third party service provider privacy policy to prevent any personal information from being shared. As a result, all of the parameters of the third party service provider privacy policy may be configured in accordance with what a "high privacy" setting would be.

In one embodiment, the SPV 104 may execute algorithms that can determine how the third party service provider privacy policy should be configured based upon the master privacy policy. In other words, even though there may not be a one to one correlation of each one of the privacy control parameters between the master privacy policy and the third party service provider privacy policy, the SPV 104 is configured to extrapolate how an end user would want to configure a particular privacy control parameter of the third party service provider privacy policy based upon the master privacy policy.

At step 508, if some of the parameters of the third party service provider privacy policy cannot be configured based upon the master privacy policy, the method 500 proceeds to step 510, where the method 500 asks the end user for clarification. For example, the SPV 104 may send an email, a text message, an interactive phone call, or the like, to an endpoint device of the end user to ask for clarification. The end user may then input how he or she would like a particular privacy control parameter to be configured if no mapping can be found. The method 500 then proceeds to step 512.

Referring back to step 508, if all of the parameters of the third party service provider privacy policy can be configured based upon the master privacy policy, the method 500 proceeds to step 512. At step 512, the method 500 configures the third party service provider privacy policy in accordance with the master privacy policy.

At step 514, the method 500 determines if additional third party service provider privacy policies need to be configured. For example, if the end user is subscribed to ten different third party service providers, then all ten privacy policies associated with each one of the ten different third party service providers would need to be configured. Thus, the method 500 advantageously may take different privacy policies from different third party service providers and map them to a common one based upon the master privacy policy stored at the SPV 104.

If additional third party service provider privacy policies need to be configured, the method 500 returns to step 504. If no additional third party service provider privacy policies need to be configured, the method 500 proceeds to step 516. The method 500 ends at step 516.

Figure 6:
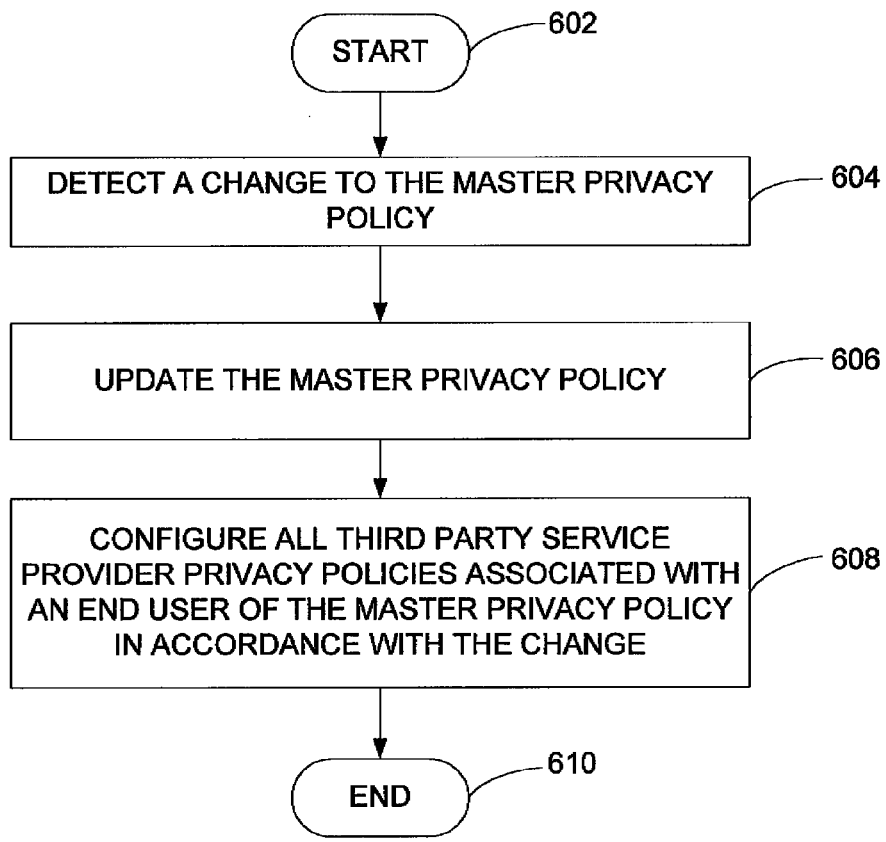
FIG. 6 illustrates an example flow chart of a method for updating the master privacy policy.

FIG. 6 illustrates a flowchart of a method 600 for updating the master privacy policy. In one embodiment, the method 600 may be performed by a SPV 104 illustrated in FIGS. 1 and 2 or a general purpose computer having a processor or a general purpose computer as illustrated in FIG. 10 and discussed below.

The method 600 begins at step 602 and proceeds to step 604. At step 604, the method 600 detects a change to the master privacy policy. The change may be made for a variety of reasons. For example, the user may simply decide to change a privacy control parameter, e.g., from a high privacy level to a medium privacy level or the change may be required due to a government change in regulations regarding privacy.

At step 606, the method 600 updates the master privacy policy. The method 600 then proceeds to step 608, where the method 600 configures all third party service provider privacy policies associated with an end user of the master privacy policy in accordance with the change. For example, the change is proliferated to all of the third party service providers automatically without requiring the end user to manually go to each third party service provider and repeat the change multiple times.

The method 600 proceeds to step 610. At step 610, the method 600 ends.

Figure 7:
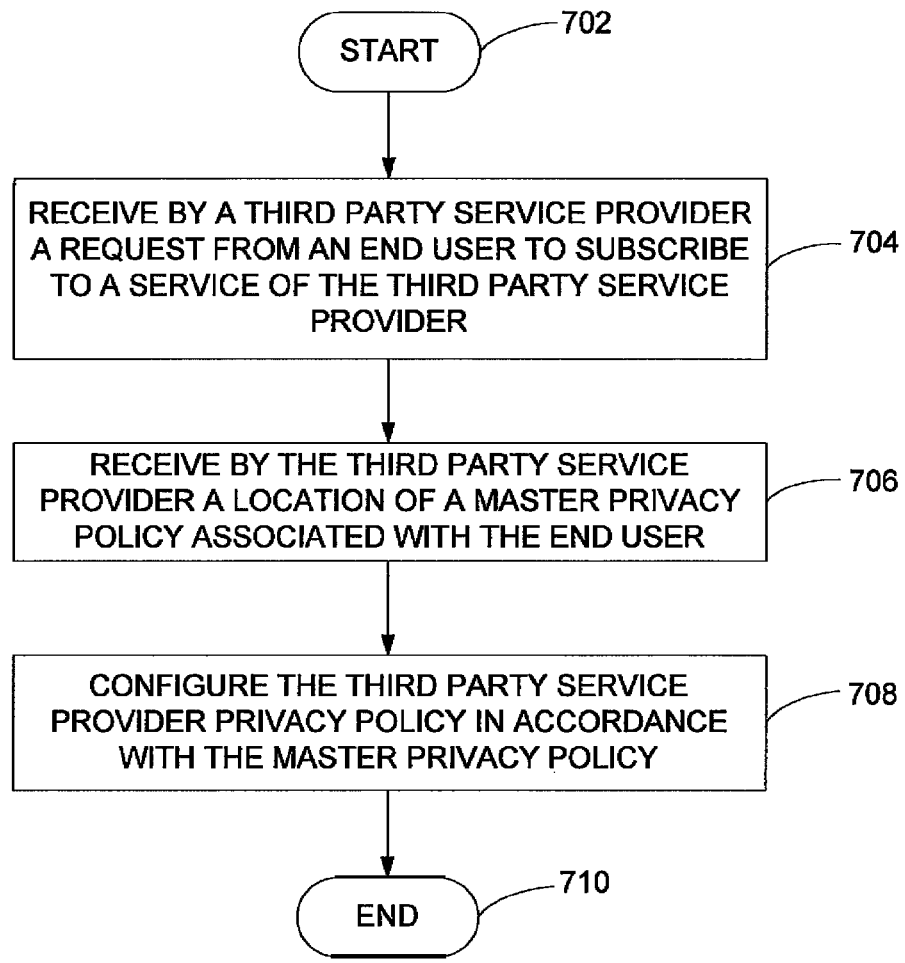
FIG. 7 illustrates an example flow chart of a method for configuring a third party service provider privacy policy when the end user subscribes for new services.

FIG. 7 illustrates a flowchart of a method 700 for configuring a third party service provider policy when the end user subscribes for new services. In one embodiment, the method 700 may be performed by a general purpose computer having a processor or a general purpose computer as illustrated in FIG. 10 and discussed below that is located at third party service provider.

The method 700 begins at step 702 and proceeds to step 704. At step 704, the method 700 receives by a third party service provider a request from an end user to subscribe to a service of the third party service provider. For example, the end user may be initiating a new service from a third party service provider that the end user is already subscribing to.

At step 706, the method 700 receives by a third party service provider a location of the master privacy policy associated with the end user. For example, the end user may provide a URL to the master privacy policy stored at the SPV 104. Thus, the third party service provider may initiate a request for the master privacy policy from the SPV 104 and obtain a copy of the master privacy policy to configure the third party service provider privacy policy. For example, the third party service provider may receive a user identification (ID) and/or an access code from the end user. In turn, the third party service provider will contact the SPV 104 using the user identification (ID) and/or an access code to obtain a copy of the master privacy policy stored at the SPV 104 that is associated with the end user. The use of the user identification (ID) and/or an access code will indicate to the SPV 104 that the end user has authorized a particular third party service provider to gain access to the end user's master privacy policy.

At step 708, the method 700 configures the third party service provider privacy policy in accordance with the master privacy policy. In one embodiment, the configuring may be performed by a mapping process as illustrated in FIG. 5 and discussed above. The method 700 ends at step 710.

Figure 8:
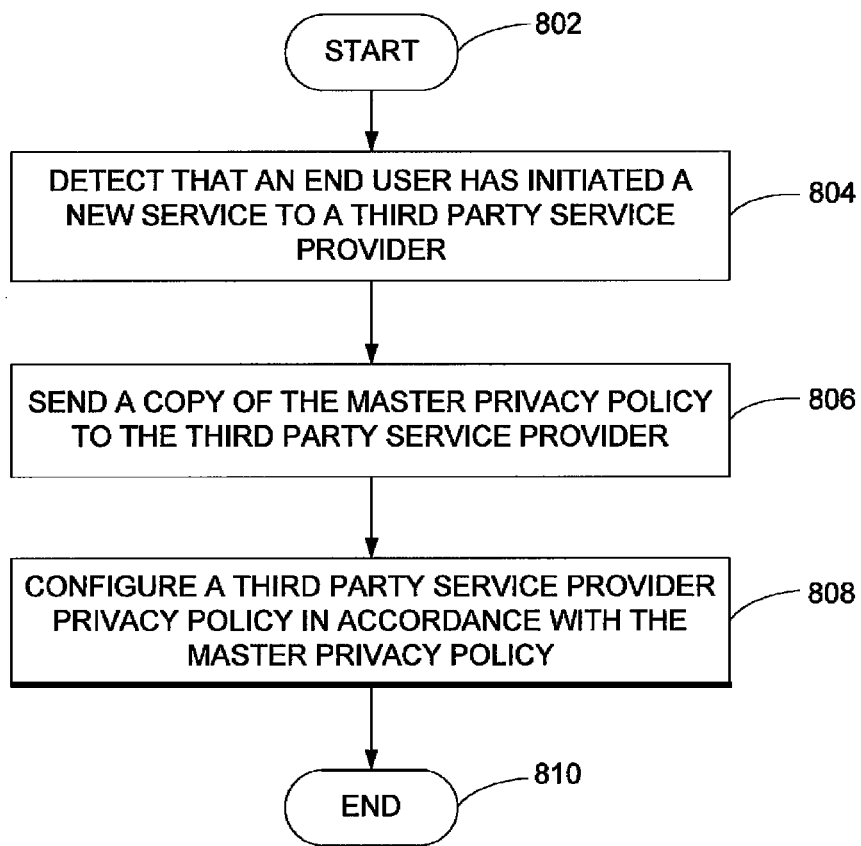
FIG. 8 illustrates another example flow chart of a method for configuring a third party service provider privacy policy when the end user subscribes for new services.

FIG. 8 illustrates a flowchart of another embodiment of a method 800 for configuring a third party service provider privacy policy when the end user subscribes for new services. In one embodiment, the method 800 may be performed by a SPV 104 illustrated in FIGS. 1 and 2 or a general purpose computer having a processor or a general purpose computer as illustrated in FIG. 10 and discussed below.

The method 800 begins at step 802 and proceeds to step 804. At step 804, the method 800 detects that an end user has initiated a new service to a third party service provider. For example, the SPV 104 may be informed by the end user directly or may receive a request from the third party service provider to provide a copy of the master privacy policy.

At step 806, the method 800 sends a copy of the master privacy policy to the third party service provider. Thus, the third party service provider may receive a copy of the master privacy policy to configure the third party service provider privacy policy.

At step 808, the method 800 configures the third party service provider privacy policy in accordance with the master privacy policy. In one embodiment, the configuring may be performed by a mapping process as illustrated in FIG. 5 and discussed above. The method 800 ends at step 810.

Figure 9:
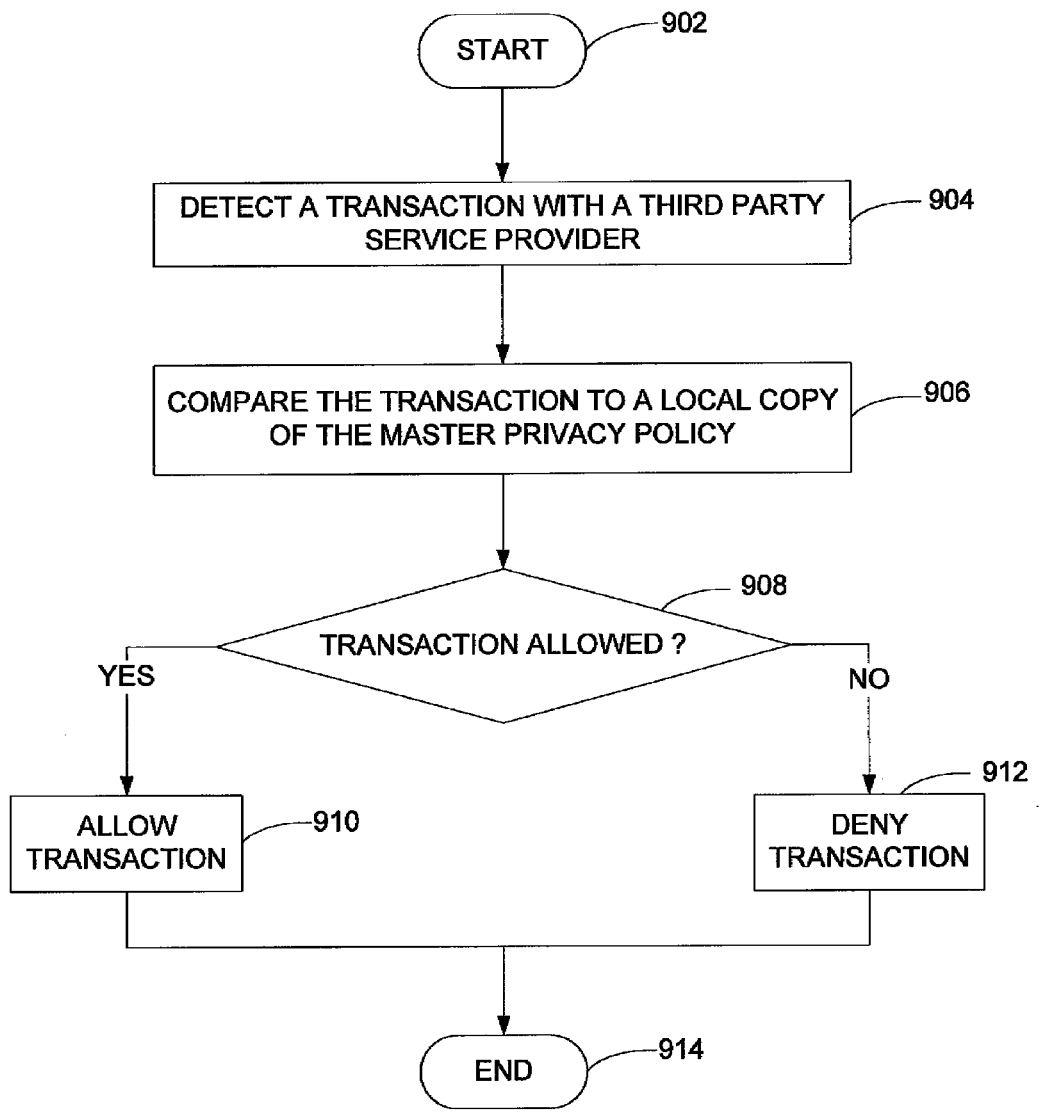
FIG. 9 illustrates an example flow chart for a method of enforcing the master privacy policy.

FIG. 9 illustrates a flowchart of a method 900 for enforcing the master privacy policy. In one embodiment, the method 900 may be performed by an endpoint illustrated in FIGS. 1 and 3 or a general purpose computer having a processor or a general purpose computer as illustrated in FIG. 10 and discussed below.

The method 900 begins at step 902 and proceeds to step 904. At step 904, the method 900 detects a transaction with a third party service provider. For example, a transaction may be any event associated with a service offered by the third party service provider. For example, the transaction may be a transmission of user information by the third party service provider, a purchase transaction between the end user and the third party service provider, and the like.

At step 906, the method 900 compares the transaction to a local copy of the master privacy policy. For example, once the master privacy policy is configured and stored initially or due to a change, a copy of the master privacy policy may be sent and stored at an endpoint device of the end user.

The endpoint device may then compare the transaction to the local copy of the master privacy policy to determine if the transaction is within the guidelines of the master privacy policy. In other words, the endpoint device may make sure that no parameters of the master privacy policy are being violated by the transaction.

At step 908, the method 900 determines if the transaction is allowed. For example, if no parameters of the master privacy policy are being violated, then the transaction may be allowed and the method 900 proceeds to step 910. At step 910, the transaction is allowed and the method 900 proceeds to step 914 where the method 900 ends.

Referring back to step 908, if one or more parameters of the master privacy policy are being violated, then the transaction may be denied and the method 900 proceeds to step 912. At step 912, the transaction is denied and the method 900 proceeds to step 914 where the method 900 ends.

It should be noted that although not explicitly specified, one or more steps of the methods 400-900 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 4-9 that recite a determining operation, or involve a decision, do not necessarily require that both branches of the determining operation be practiced. In other words, one of the branches of the determining operation can be deemed as an optional step.

FIG. 10 depicts a high-level block diagram of a general-purpose computer suitable for use in performing the functions described herein. As depicted in FIG. 10, the system 1000 comprises a hardware processor element 1002 (e.g., a CPU), a memory 1004, e.g., random access memory (RAM) and/or read only memory (ROM), a module 1005 for providing a policy based privacy service control in a communications network, and various input/output devices 1006 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 1005 providing a policy based privacy service control in a communications network can be loaded into memory 1004 and executed by processor 1002 to implement the functions as discussed above. As such, the present method 1005 providing a policy based privacy service control in a communications network (including associated data structures) of the present disclosure can be stored on a non-transitory (physical and tangible) computer readable storage medium, e.g., RAM memory, magnetic or optical drive or diskette and the like. For example, the processor 1002 can be programmed or configured with instructions (e.g., computer readable instructions) to perform the steps of methods 400-900.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a master privacy policy in a communications network, comprising:
   receiving, via a processor of an application server deployed within the communications network, a privacy control parameter from a user to configure the master privacy policy of the user;
   storing, via the processor, the master privacy policy of the user that is configured in the communications network; and
   applying, via the processor, the master privacy policy of the user to configure a third party service provider privacy policy of a third party service provider providing a service to the user based upon the master privacy policy of the user, wherein the applying comprises:
      determining a mapping is found between the master privacy policy for one control parameter of a plurality of control parameters of the third party service provider privacy policy; and
      configuring the one control parameter of the third party service provider privacy policy in accordance with the master privacy policy.

2. The method of claim 1, wherein the privacy control parameter comprises a plurality of privacy control parameters.

3. The method of claim 1, wherein when the mapping is not found for any one of the plurality of control parameters, then sending a request to the user for requesting a clarification as to any one of the plurality of control parameters of the third party service provider privacy policy that is not found.

4. The method of claim 1, further comprising:
   receiving a change to a control parameter of the master privacy policy;
   updating the master privacy policy in accordance with the change;
   storing the master privacy policy that is updated; and
   proliferating the master privacy policy that is updated to the third party service provider.

5. The method of claim 4, wherein the proliferating is performed automatically without a request from the third party service provider.

6. The method of claim 1, wherein the third party service provider comprises a plurality of third party service providers, wherein a third party service provider privacy policy for each one of the plurality of third party service providers is configured based upon the master privacy policy.

7. The method of claim 1, further comprising:
   detecting a transaction with the third party service provider; and
   enforcing the third party service provider privacy policy that was configured based upon the master privacy policy.

8. The method of claim 7, wherein the enforcing is performed by an endpoint device having a copy of the master privacy policy.

9. The method of claim 1, wherein the privacy control parameter comprises an overall level of privacy.

10. The method of claim 1, wherein the privacy control parameter comprises a sharing parameter.

11. A non-transitory computer-readable medium storing a plurality of instructions which, when executed by a processor of an application server deployed within a communication network, cause the processor to perform operations for providing a master privacy policy in the communications network, the operations comprising:
   receiving a privacy control parameter from a user to configure the master privacy policy of the user;
   storing the master privacy policy of the user that is configured in the communications network; and
   applying the master privacy policy of the user to configure a third party service provider privacy policy of a third party service provider providing a service to the user based upon the master privacy policy of the user, wherein the applying comprises:
      determining a mapping is found between the master privacy policy for one control parameter of a plurality of control parameters of the third party service provider privacy policy; and
      configuring the one control parameter of the third party service provider privacy policy in accordance with the master privacy policy.

12. The non-transitory computer-readable medium of claim 11, wherein the privacy control parameter comprises a plurality of privacy control parameters.

13. The non-transitory computer-readable medium of claim 11, wherein when the mapping is not found for any one of the plurality of control parameters, then sending a request to the user for requesting a clarification as to any one of the plurality of control parameters of the third party service provider privacy policy that is not found.

14. The non-transitory computer-readable medium of claim 11, further comprising:
- receiving a change to a control parameter of the master privacy policy;
- updating the master privacy policy in accordance with the change;
- storing the master privacy policy that is updated; and
- proliferating the master privacy policy that is updated to the third party service provider.

15. The non-transitory computer-readable medium of claim 14, wherein the proliferating is performed automatically without a request from the third party service provider.

16. The non-transitory computer-readable medium of claim 11, wherein the third party service provider comprises a plurality of third party service providers, wherein a third party service provider privacy policy for each one of the plurality of third party service providers is configured based upon the master privacy policy.

17. The non-transitory computer-readable medium of claim 11, further comprising:
- detecting a transaction with the third party service provider; and
- enforcing the third party service provider privacy policy that was configured based upon the master privacy policy.

18. An apparatus for providing a master privacy policy in a communications network, comprising:
- a processor of an application server deployed within the communication network; and
- a computer readable medium storing a plurality of instructions which, when executed by the processor, cause the processor to perform operations, the operations comprising:
  - receiving a privacy control parameter from a user to configure the master privacy policy of the user;
  - storing the master privacy policy of the user that is configured in the communications network; and
  - applying the master privacy policy of the user to configure a third party service provider privacy policy of a third party service provider providing a service to the user based upon the master privacy policy of the user, wherein the applying comprises:
    - determining a mapping is found between the master privacy policy for one control parameter of a plurality of control parameters of the third party service provider privacy policy; and
    - configuring the one control parameter of the third party service provider privacy policy in accordance with the master privacy policy.

* * * * *